US006584187B2

(12) United States Patent
Nakamura

(10) Patent No.: US 6,584,187 B2
(45) Date of Patent: *Jun. 24, 2003

(54) TRANSFER SERVICE METHOD FOR TELEPHONE NETWORK

(75) Inventor: Teruo Nakamura, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 91 days.

(21) Appl. No.: 09/179,852

(22) Filed: Oct. 28, 1998

(65) Prior Publication Data

US 2002/0041669 A1 Apr. 11, 2002

(30) Foreign Application Priority Data

Oct. 29, 1997 (JP) .............................. 9-297353

(51) Int. Cl.[7] .............................................. H04M 3/42
(52) U.S. Cl. ............................. 379/211.01; 379/211.02; 379/212.01
(58) Field of Search ............... 379/230, 207.01–207.16, 379/210.01–210.03, 211.01–211.05, 212.01; 455/414, 417

(56) References Cited

U.S. PATENT DOCUMENTS 5,247,571 A * 9/1993 Kay et al. .................. 379/207
5,422,941 A * 6/1995 Hasenauer et al. ......... 379/207
5,539,817 A * 7/1996 Wilkes ....................... 379/230

FOREIGN PATENT DOCUMENTS

| JP | 63-296454 | 12/1988 |
| JP | 4-133552 | 5/1992 |
| JP | 5-14502 | 1/1993 |

* cited by examiner

Primary Examiner—Benny Q. Tieu
(74) Attorney, Agent, or Firm—Foley & Lardner

(57) ABSTRACT

The invention provides a transfer service method for a telephone network by which, even if physical accommodation position information of a telephone set of a transfer destination is not registered in an electronic exchange connected by a wire or wireless to a telephone set on the originating side from which a telephone call is to be transferred, a transfer service to the telephone set of the transfer destination corresponding to a logic number can be enjoyed. The transfer service method comprises the steps of discriminating whether a telephone number by a telephone call originated from a telephone set is a telephone number whose physical accommodation position information is registered in an electronic exchange or a logic number whose physical accommodation position information is not registered in the electronic exchange, referring, when the telephone number is a logic number, to a logic number-transfer destination telephone number table set in advance in a memory of the electronic exchange and calling a telephone set of a transfer destination telephone number corresponding to the logic number, and performing a transfer service set in advance to the thus called telephone set.

7 Claims, 4 Drawing Sheets

FIG.3

TELEPHONE NUMBER-PHYSICAL ACCOMMODATION POSITION INFORMATION TABLE

| TELEPHONE NUMBER | PHYSICAL ACCOMMODATION POSITION |
|---|---|
| 2000 | 000001 |
| 3000 | LOGIC NUMBER |
| 3001 | LOGIC NUMBER |
| 3002 | LOGIC NUMBER |
| 3003 | LOGIC NUMBER |
| ⋮ | ⋮ |

FIG.4

LOGIC NUMBER-TRANSFER DESTINATION
TELEPHONE NUMBER TABLE

| LOGIC NUMBER | TRANSFER DESTINATION NUMBER |
|---|---|
| 3000 | 2000 |
| 3001 | 8262001 |
| 3002 | 0501269999 |
| 3003 | 0301269999 |
| ⋮ | ⋮ |

TRANSFER SERVICE METHOD FOR TELEPHONE NETWORK

BACKGROUND OF THE INVENTION

1. Field of the Invention

The present invention relates to a transfer service method for a telephone network.

2. Description of the Related Art

Conventionally, as one of transfer services which are provided to telephone subscribers, an unattended transfer service is well known wherein, if the telephone number of an original telephone set and the telephone number of a transfer destination are communicated to a telephone business proprietor in advance, then if a telephone call terminates at the original telephone set when the telephone subscriber of the original telephone set is not present around the telephone set or the original telephone set cannot be used for communication or in a like case, the telephone call is automatically transferred to the telephone set of the transfer destination by an electronic exchange.

However, such a conventional unattended transfer service can be enjoyed only where the telephone number of the original telephone set and physical accommodation position information corresponding to the telephone set of the transfer destination are registered in the electronic exchange, but cannot be enjoyed by any telephone set with regard to which no such information is registered.

A method directed to a service different from the unattended transfer service is disclosed in Japanese Patent Laid-Open Application No. Heisei 4-133552 wherein a unique logic number is allocated to a user (originating party) which wants to enjoy provision of personal communication information of an accounting destination, a communication district, a terminating method and so forth and is registered in advance as a data base in a storage unit of a switching center, and when the originating party dials on the telephone set using the logic number of the originating party and an identification number which designates a service to be enjoyed, the storage unit is accessed based on the logic number to read out the designated personal communication information and the personal communication information is sent back to the telephone set of the originating party.

Also in this instance, however, in order to allow the telephone set to enjoy the service, physical accommodation position information corresponding to the telephone number thereof must be registered in advance in the switching center.

SUMMARY OF THE INVENTION

It is an object of the present invention to provide a transfer service method for a telephone network by which, even if physical accommodation position information of a telephone set of a transfer destination is not registered in an electronic exchange connected by a wire or wireless to a telephone set on the originating side from which a telephone call is to be transferred, a transfer service to the telephone set of the transfer destination corresponding to a logic number can be enjoyed.

In order to attain the object described above, according to the present invention, there is provided a transfer service method for a telephone network, comprising the steps of discriminating whether a telephone number by a telephone call originated from a telephone set is a telephone number whose physical accommodation position information is registered in an electronic exchange or a logic number whose physical accommodation position information is not registered in the electronic exchange, referring, when the telephone number is a logic number, to a logic number-transfer destination telephone number table set in advance in a memory of the electronic exchange and calling a telephone set of a transfer destination telephone number corresponding to the logic number, and performing a transfer service set in advance to the thus called telephone set.

The discrimination of whether the telephone number by the telephone call originated from the first-mentioned telephone set is a telephone number whose physical accommodation position information is registered in the electronic exchange or a logic number whose physical accommodation position information is not registered in the electronic exchange may be performed by referring to a telephone number-physical accommodation position information table set in advance in the memory of the electronic exchange.

With the transfer service method for a telephone network, even if physical accommodation position information of the telephone set of the transfer destination is not registered in the electronic exchange connected by a wire or wireless to the telephone set on the originating side from which a telephone call is to be transferred, a transfer service to the telephone set of the transfer destination corresponding to a physical number can be enjoyed.

The above and other objects, features and advantages of the present invention will become apparent from the following description and the appended claims, taken in conjunction with the accompanying drawings.

BRIEF DESCRIPTION OF THE DRAWINGS

FIG. 3 is a diagrammatic view illustrating an example of registrations of a telephone number-physical accommodation position information table in a memory of the electronic exchange shown in FIG. 1; and FIG. 4 is a similar view but illustrating a logic number-transfer destination telephone number table in the memory of the electronic change shown in FIG. 1.

DESCRIPTION OF THE PREFERRED EMBODIMENT

Figure 1:
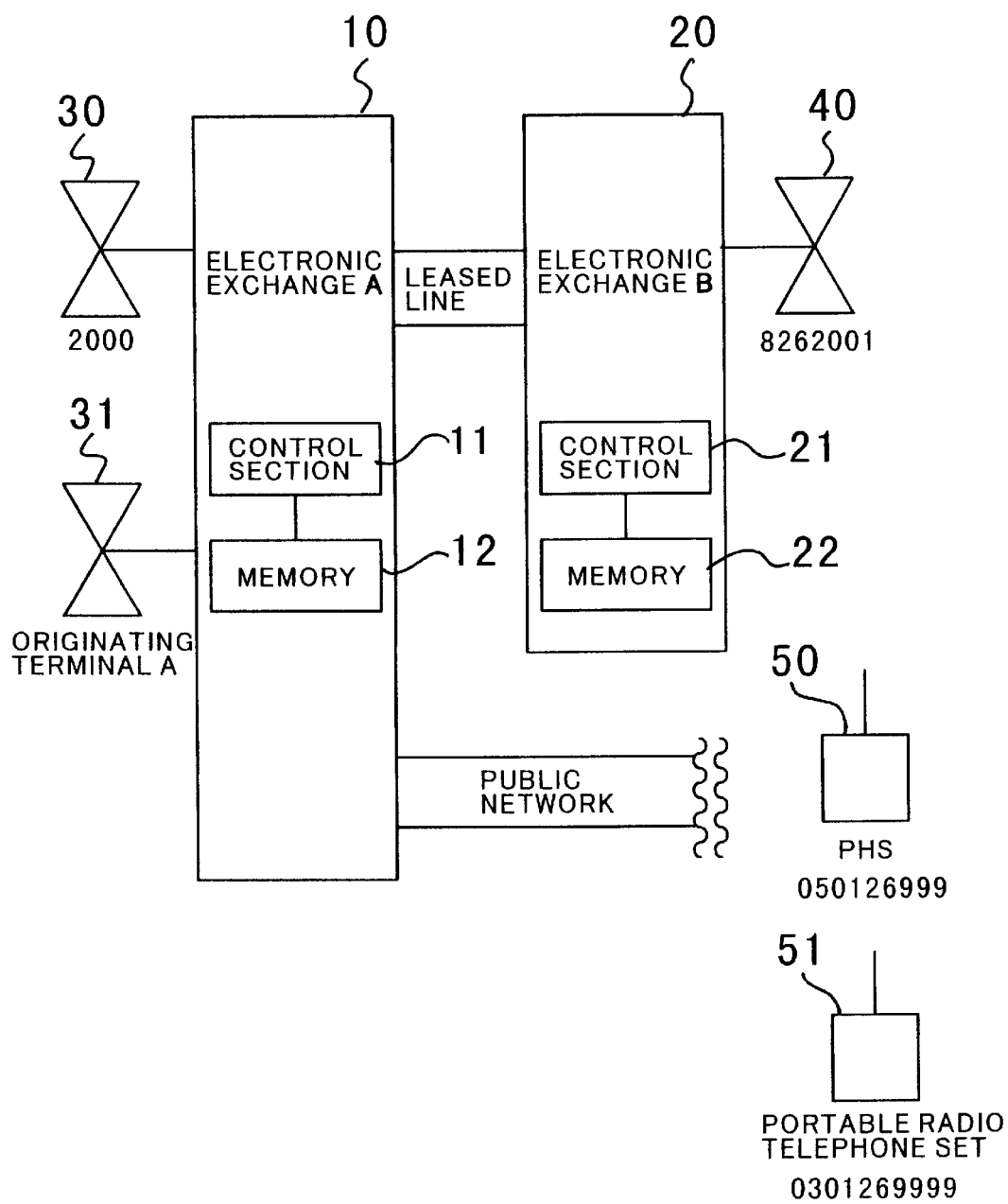
FIG. 1 is a diagrammatic view showing an example of a system construction of a telephone network to which the transfer service method of the present invention is applied.

Referring first to FIG. 1, there is shown an example of a system construction of a telephone network to which the transfer service method of the present invention is applied. The system shown includes two electronic exchanges 10 and 20 provided at different locations and connected to each other over a leased line. The electronic exchange 10 includes a control section 11 and a memory 12, and also the electronic exchange 20 includes a control section 21 and a memory 22.

Telephone sets 30 and 31 are connected to the electronic exchange 10 by a wire, and a telephone set 40 is connected to the electronic exchange 20 by a wire. The electronic exchange 10 can be connected to a portable radio telephone set 50 of the PHS (Personal Handyphone System) system or a portable radio telephone set 50 of the PDC (Personal Digital Cellular) system over a wireless public network.

In each of the memory 12 of the electronic exchange 10 and the memory 22 of the electronic exchange 20, a telephone number-physical accommodation position information table and a logic number-transfer destination telephone number table are provided. In the telephone number-physical accommodation position information table, telephone numbers and physical accommodation position information of telephone sets of subscribers are registered in a corresponding relationship to each other. Meanwhile, in the logic number-transfer destination telephone number table, logic numbers which are telephone numbers which do not have corresponding physical accommodation position information and telephone numbers of transfer destinations are registered in a corresponding relationship to each other.

FIG. 3 illustrates an example of registrations of the telephone number-physical accommodation position information table of the memory 12 of the electronic exchange 10, and FIG. 4 illustrates an example of registrations of the logic number-transfer destination telephone number table of the memory 12. In the telephone number-physical accommodation position information table of FIG. 3, the telephone number of the telephone set 30 of FIG. 1 is registered as "2000" and the physical accommodation position information of the telephone set is registered to be "000001", but no such registration is not made for the telephone set 31. It is to be noted that, while telephone numbers within a certain range such as "3000", "3001", "3002" and "3003" have no corresponding registrations of the physical accommodation position information, if any of the telephone numbers is called, then retrieval of the logical number-transfer destination telephone number table for a logic number for a transfer service is performed.

The logical number-transfer destination telephone number table of FIG. 4 indicates that the transfer destination telephone number corresponding to the logic number "3000" is "2000" which is the telephone number of the telephone set 30 of FIG. 1; the transfer destination telephone number corresponding to the logic number "3001" is "8262001" which is the telephone number of the telephone set 40; the transfer destination telephone number corresponding to the logic number "3002" is "0501269999" which is the telephone number of the portable radio telephone set 50 of the PHS system; and the transfer destination telephone number corresponding to the logic number "3003" is "0301269999" which is the telephone number of the portable radio telephone set 51 of the PDC system.

Figure 2:
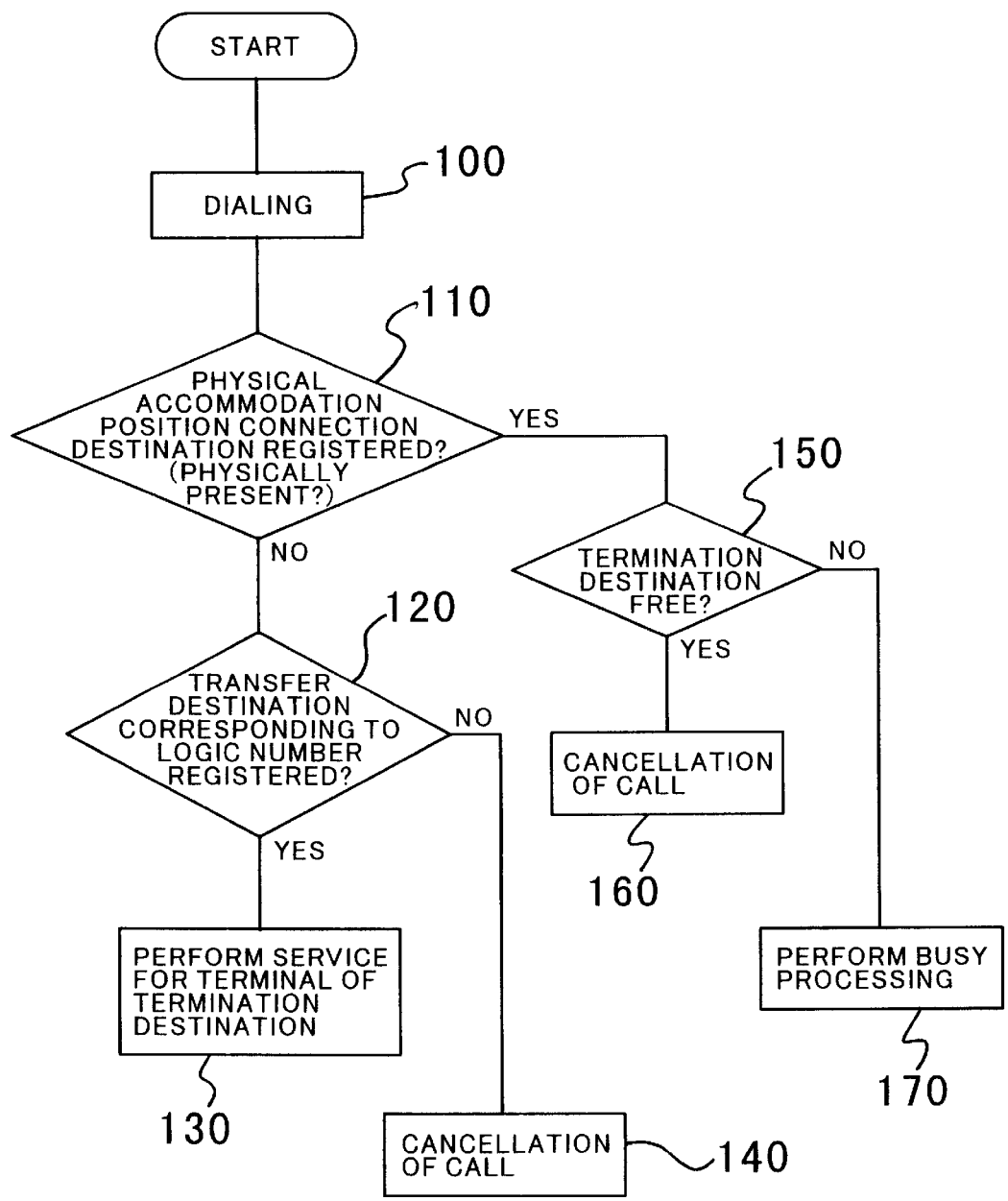
FIG. 2 is a flow chart illustrating control processing of a control section of an electronic exchange of the telephone network of FIG. 1.

A flow of operation of the system processed under the control of the control section 11 of the electronic exchange 10 when the telephone set 31 of FIG. 1 whose physical accommodation position information is not registered serves as an originating terminal and thus originates a telephone call to the electronic exchange 10 is described with reference to FIG. 2.

When a telephone number is dialed on the telephone set 31 to originate a telephone call (step 100), it is discriminated whether or not physical accommodation position information corresponding to the dialed telephone number of the connection destination is registered in the telephone number-physical accommodation position information table (step 110). If physical accommodation position information corresponding to the dialed telephone number of the connection destination is registered already, then it is further discriminated whether or not the terminal of the connection destination is free (step 150). If the terminal of the connection destination is free, then termination processing is performed (step 160), but if the terminal of the connection destination is busy, busy processing is performed (step 170).

If physical accommodation position information corresponding to the dialed telephone number of the connection destination is not registered in the telephone number-physical accommodation position information table, then the dialed number is treated as a logic number, and it is discriminated whether or not the transfer destination corresponding to the logic number is registered in the logic number-transfer destination telephone number table (step 120). If the transfer destination telephone number corresponding to the logic number is not registered, then the originated call is cancelled (step 140).

If the transfer destination telephone number corresponding to the logic number is registered, then a transfer service to the terminal of the transfer destination is performed (step 130). For example, if the telephone set 31 of the originating terminal dials "3002" which is a logic number, then since the transfer destination telephone number corresponding to the logic number is "0501269999", a transfer service to the portable radio telephone set 50 of the PHS system is performed.

While a preferred embodiment of the present invention has been described using specific terms, such description is for illustrative purposes only, and it is to be understood that changes and variations may be made without departing from the spirit or scope of the following claims.

What is claimed is:

1. A transfer service method performed in an electronic exchange, comprising:
    determining whether a dialed telephone number of a telephone call originated from a telephone set connected to the electronic exchange is associated with physical position information corresponding to a physical position in said electronic exchange accommodating a telephone set accessed by said dialed telephone number; and
    if the dialed telephone number is not associated with physical position information,
        determining a transfer destination telephone number associated with the dialed telephone number in the electronic exchange;
        calling the transfer destination telephone number; and
        transferring the telephone call to the transfer destination telephone number.

2. A transfer service method performed in an electronic exchange as claimed in claim 1, wherein determining whether a dialed telephone number is associate with physical position information is performed by referring to a telephone number-physical position information table stored in a memory of said electronic exchange.

3. A transfer service method performed in an electronic exchange as claimed in claim 1, wherein determining a transfer destination telephone number corresponding to said dialed telephone number in the electronic exchange is performed by referring to a logic number-transfer destination telephone number table stored in a memory of said electronic exchange;
    whereby said transfer destination telephone number includes at least a communication line not associated with physical position information in said electronic exchange including a mobile telephone.

4. A transfer service method performed in an electronic exchange, comprising:
    determining whether a dialed telephone number of a telephone call originating from a telephone set connected to the electronic exchange corresponds to a designated member group communication line corresponding to a physical position accommodating a telephone set of said dialed telephone number within the electronic exchange, and if the dialed telephone number does not correspond to a designated member group communication line within the electronic exchange, determining a transfer destination telephone number corresponding to said dialed telephone number said transfer destination telephone number not associated with physical position information and including a mobile telephone;

calling the transfer destination telephone number; and transferring the telephone call to the transfer destination telephone number.

5. A transfer service method performed in an electronic exchange as claimed in claim 4, wherein determining whether a dialed telephone number corresponds to a designated member group communication line within the electronic exchange is performed by referring to a telephone number-physical position information table stored in a memory of said electronic exchange.

6. A transfer service method performed in an electronic exchange as claimed in claim 4, wherein determining a transfer destination telephone number corresponding to said dialed telephone number in the electronic exchange is performed by referring to a logic number-transfer destination telephone number table stored in a memory of said electronic exchange.

7. A method for automatically transferring a call from a dialed telephone number to a transfer destination number in a telephone network exchange comprising the steps of:

a. accessing a number-physical accommodation position table in a memory device of said telephone network exchange to determine if said dialed telephone number (1) is associated with a destination number corresponding to a physical position in said telephone network exchange accommodating a destination telephone set; or (2) is associated with a logic number;

b. if said dialed telephone number is found to be associated with a physical position accommodating said destination telephone set, routing said call from said dialed telephone to said destination number as said transfer destination number; and c. if said dialed telephone number is found to be associated with said logic number, accessing a logic number-transfer destination telephone number table to determine said transfer destination number and routing said call from said dialed telephone number to said transfer destination number.

\* \* \* \* \*